United States Patent
Saegusa et al.

(10) Patent No.: US 9,843,506 B2
(45) Date of Patent: Dec. 12, 2017

(54) DISTRIBUTED CONTROL SYSTEM AND CONTROL METHOD THEREOF

(71) Applicant: Hitachi, Ltd., Chiyoda-ku, Tokyo (JP)

(72) Inventors: Takashi Saegusa, Tokyo (JP);
Terunobu Funatsu, Tokyo (JP);
Toyokazu Takagi, Tokyo (JP);
Tomohiro Inoue, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 14/768,907

(22) PCT Filed: Mar. 21, 2013

(86) PCT No.: PCT/JP2013/058146
§ 371 (c)(1),
(2) Date: Aug. 19, 2015

(87) PCT Pub. No.: WO2014/147800
PCT Pub. Date: Sep. 25, 2014

(65) Prior Publication Data
US 2016/0006648 A1    Jan. 7, 2016

(51) Int. Cl.
*H04L 12/721* (2013.01)
*H04L 12/40* (2006.01)
(Continued)

(52) U.S. Cl.
CPC ........ *H04L 45/44* (2013.01); *H04L 12/40182* (2013.01); *H04L 45/24* (2013.01);
(Continued)

(58) Field of Classification Search
None
See application file for complete search history.

(56) References Cited

U.S. PATENT DOCUMENTS

| 2002/0112030 A1 | 8/2002 | Iwami et al. |
| 2003/0169688 A1* | 9/2003 | Mott ............. H04L 12/5695 370/230 |

(Continued)

FOREIGN PATENT DOCUMENTS

| JP | 4-246956 A | 9/1992 |
| JP | 2002-244899 A | 8/2002 |

(Continued)

OTHER PUBLICATIONS

International Search Report (PCT/ISA/210) dated Jun. 18, 2013 with English translation (five pages).

*Primary Examiner* — Christopher Crutchfield
*Assistant Examiner* — Alan Lindenbaum
(74) *Attorney, Agent, or Firm* — Crowell & Moring LLP

(57) ABSTRACT

In a distributed control system including a central communication device, terminal communication devices to which target devices to be controlled are connected, and a network including multiple communication paths connecting the central communication device and terminal communication devices, each terminal communication device includes a calculation input/output performance storage unit storing input/output performance of a calculation unit for controlling the target devices to be controlled and a control input/output performance storage unit storing the performance of the input/output control units of the target devices to be controlled, and the central communication device collects input/output performance information previously stored in these storage units, determines communication paths of the terminal communication units and a packet division method in such a manner that an amount of a communication data of a network and response performance requested of the distributed control system are satisfied, on the basis of the collected input/output performance information and sets the (Continued)

determination results in the terminal communication devices.

20 Claims, 13 Drawing Sheets

(51) Int. Cl.
    *H04L 12/707* (2013.01)
    *H04L 12/803* (2013.01)
    *H04L 12/717* (2013.01)
    *H04L 12/727* (2013.01)
    *H04L 12/733* (2013.01)
    *H04L 12/805* (2013.01)

(52) U.S. Cl.
    CPC ............ *H04L 45/42* (2013.01); *H04L 47/125* (2013.01); *H04L 45/121* (2013.01); *H04L 45/122* (2013.01); *H04L 47/365* (2013.01); *H04L 2012/4026* (2013.01)

(56) References Cited

U.S. PATENT DOCUMENTS

| | | | |
|---|---|---|---|
| 2006/0002368 A1* | 1/2006 | Budampati | H04L 45/22 370/351 |
| 2011/0200049 A1* | 8/2011 | Saegusa | H04L 12/40156 370/394 |

FOREIGN PATENT DOCUMENTS

| | | |
|---|---|---|
| JP | 2005-303700 A | 10/2005 |
| JP | 2010-219801 A | 9/2010 |
| JP | 2011-166581 A | 8/2011 |
| JP | 2012-175563 A | 9/2012 |

\* cited by examiner

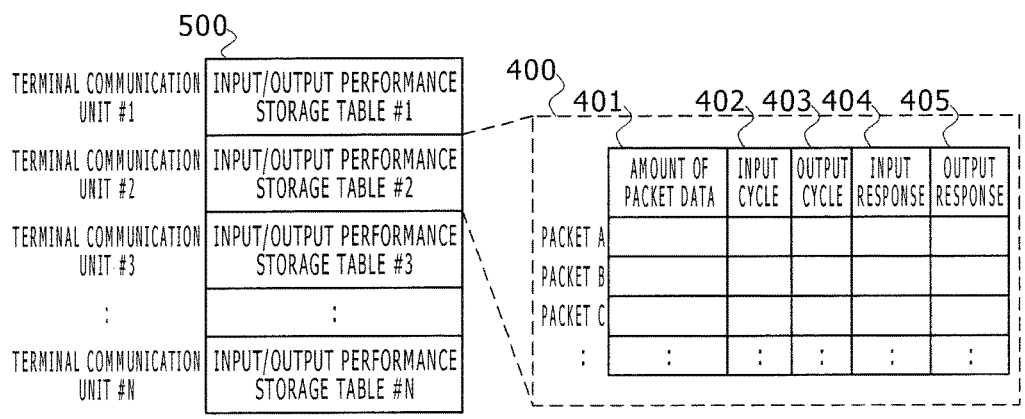

FIG. 9

(TRANSMISSION DIRECTION: FROM CENTRAL COMMUNICATION UNIT TO TERMINAL COMMUNICATION UNIT)

900 / 901

| | | OUTPUT PORT NUMBER SETTING | | | |
|---|---|---|---|---|---|
| | | TRANSMISSION DESTINATION: TERMINAL COMMUNICATION MEANS #1 | TRANSMISSION DESTINATION: TERMINAL COMMUNICATION MEANS #2 | ... | TRANSMISSION DESTINATION: TERMINAL COMMUNICATION UNIT #N |
| SETTING DESTINATION | TERMINAL COMMUNICATION UNIT #1 | | | ... | |
| | TERMINAL COMMUNICATION UNIT #2 | | | ... | |
| | : | : | : | | : |
| | TERMINAL COMMUNICATION UNIT #N | | | ... | |

(TRANSMISSION DIRECTION: FROM TERMINAL COMMUNICATION UNIT TO CENTRAL COMMUNICATION UNIT)

910 / 911

| | | OUTPUT PORT NUMBER SETTING | | | |
|---|---|---|---|---|---|
| | | TRANSMISSION SOURCE: TERMINAL COMMUNICATION MEANS #1 | TRANSMISSION SOURCE: TERMINAL COMMUNICATION MEANS #2 | ... | TRANSMISSION SOURCE: TERMINAL COMMUNICATION UNIT #N |
| SETTING DESTINATION | TERMINAL COMMUNICATION UNIT #1 | | | ... | |
| | TERMINAL COMMUNICATION UNIT #2 | | | ... | |
| | : | : | : | | : |
| | TERMINAL COMMUNICATION UNIT #N | | | ... | |

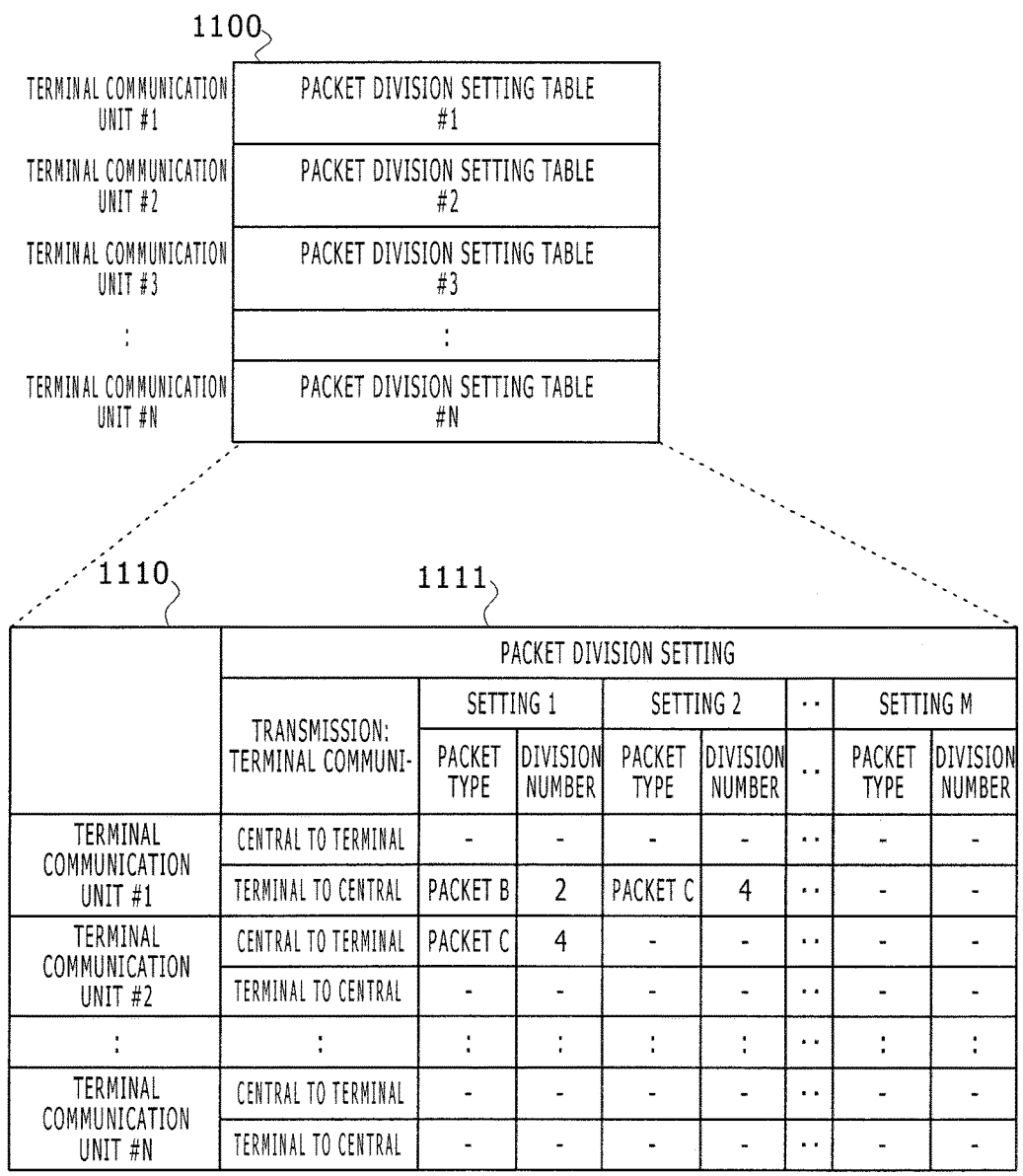

FIG.12

122 — COMMUNICATION PATH SETTING UNIT

1200 / 1201 / 1202

|  | CENTRAL TO TERMINAL | | TERMINAL TO CENTRAL | |
|---|---|---|---|---|
|  | PRESENCE OR ABSENCE OF SETTING | TRANSMISSION DESTINATION PORT NUMBER | PRESENCE OR ABSENCE OF SETTING | TRANSMISSION DESTINATION PORT NUMBER |
| TERMINAL COMMUNICATION UNIT #1 | ABSENCE |  | PRESENCE |  |
| TERMINAL COMMUNICATION UNIT #2 | PRESENCE |  | ABSENCE |  |
| : | : | : | : | : |
| TERMINAL COMMUNICATION UNIT #N | ABSENCE |  | ABSENCE |  |

1010 / 1011

|  |  | OUTPUT PORT NUMBER SETTING | | | | | | |
|---|---|---|---|---|---|---|---|---|
|  |  | SETTING 1 | | SETTING 2 | | ·· | SETTING M | |
|  | COMMUNICATION DIRECTION | PACKET TYPE | PORT NUMBER | PACKET TYPE | PORT NUMBER | ·· | PACKET TYPE | PORT NUMBER |
| TERMINAL COMMUNICATION UNIT #1 | CENTRAL TO TERMINAL | PACKET D | 3 | - | - | ·· | - | - |
|  | TERMINAL TO CENTRAL | PACKET B1 | 1 | PACKET B2 | 2 | ·· | - | - |
| TERMINAL COMMUNICATION UNIT #2 | CENTRAL TO TERMINAL | PACKET A | 2 | PACKET C1 | 5 | ·· | - | - |
|  | TERMINAL TO CENTRAL | - | - | - | - | ·· | - | - |
| : | : | : | : | : | : | ·· | : | : |
| TERMINAL COMMUNICATION UNIT #N | CENTRAL TO TERMINAL | - | - | - | - | ·· | - | - |
|  | TERMINAL TO CENTRAL | - | - | - | - | ·· | - | - |

FIG.13

123 PACKET DIVISION SETTING UNIT

1300    1301

|  | PRESENCE OR ABSENCE OF DIVISION | |
|---|---|---|
|  | CENTRAL TO TERMINAL | TERMINAL TO CENTRAL |
| TERMINAL COMMUNICATION UNIT #1 | ABSENCE | PRESENCE |
| TERMINAL COMMUNICATION UNIT #2 | PRESENCE | ABSENCE |
| : | : | : |
| TERMINAL COMMUNICATION UNIT #N | ABSENCE | ABSENCE |

1110    1111

| | | PACKET DIVISION SETTING | | | | | | |
|---|---|---|---|---|---|---|---|---|
| | COMMUNICATION DIRECTION | SETTING 1 | | SETTING 2 | | .. | SETTING M | |
| | | PACKET TYPE | DIVISION NUMBER | PACKET TYPE | DIVISION NUMBER | .. | PACKET TYPE | DIVISION NUMBER |
| TERMINAL COMMUNICATION UNIT #1 | CENTRAL TO TERMINAL | - | - | - | - | .. | - | - |
| | TERMINAL TO CENTRAL | PACKET B | 2 | PACKET C | 4 | .. | - | - |
| TERMINAL COMMUNICATION UNIT #2 | CENTRAL TO TERMINAL | PACKET C | 4 | - | - | .. | - | - |
| | TERMINAL TO CENTRAL | - | - | - | - | .. | - | - |
| : | : | : | : | : | : | .. | : | : |
| TERMINAL COMMUNICATION UNIT #N | CENTRAL TO TERMINAL | - | - | - | - | .. | - | - |
| | TERMINAL TO CENTRAL | - | - | - | - | .. | - | - |

DISTRIBUTED CONTROL SYSTEM AND CONTROL METHOD THEREOF

TECHNICAL FIELD

The present invention relates to a distributed control system which connects target devices to be controlled through a communication network to controls them, and a control method thereof.

BACKGROUND ART

There have been employed distributed control systems in recent years that control distributed target devices to be controlled, such as sensors or actuators, using a network in order to save the wiring in industrial equipment or factory automation (FA).

Typically, a distributed control system includes a central communication device which centrally controls the entire sequence and multiple terminal communication devices which are connected to target devices to be controlled and control the input and output of the target devices to be controlled. In the distributed control system, the central communication device and terminal communication devices form a network. This network is typically constructed using a topology such as a multi-drop or daisy chain. The central communication device transfers control command information to the terminal communication devices through this network, and the terminal communication devices control the input and output of the target devices to be controlled in accordance with the control command information. The terminal communication devices also transfer input information from the target devices to be controlled to the central communication device through the network.

As seen above, in the distributed control system, the central communication device can centrally control all the target devices to be controlled on the network by transmitting or receiving control information, such as control command information or input information, to or from the terminal communication devices through the network.

In the field of industrial equipment, distributed control systems are required to provide control responses faster and have higher functionality as the speed and functionality of the equipment are increased. For this reason, the distributed control systems must transmit a great amount of control information at high speed and therefore are required to reduce the communication response time of the network and increase the amount of data which can be communicated.

These improvements in the performance of the network often require making changes to the hardware of the central communication device and terminal communication devices of the distributed control system or making changes to the software in accordance with changes in the communication control method. Designing these changes involves many man-hours, making it difficult to improve the performance of the distributed control system.

One conceivable method for solving these problems is to improve the performance of the network by changing the settings of the communication control method without changing the fundamental communication performance (electrical transmission speed, communication specification, or the like) of the distributed control system. That is, the man-hours are reduced by reducing the frequency with which a change is made to the hardware of the central communication device and terminal communication devices. Another conceivable method is to reduce the man-hours by automatically changing the settings of the network communication control method of the distributed control system.

Conventional technologies for implementing these methods include a technology disclosed in Patent Document 1. A system according to the Patent Document 1 classifies packets into at least two types, including high-priority communication packets and low-priority communication packets, on the basis of predetermined communication priority and inputs the classified packets, and then makes the respective types of packets redundant. This system employs a packet division method of, when transmitting low-priority packets through one packet communication network, dividing those packets in accordance with the target delay time and amount of communication data before making those packets redundant. This conventional technology prevents communications using high-priority communication packets from being blocked by communications using low-priority communication packets and therefore can be expected to improve the performance of the network by setting priorities to communication packets.

CITATION LIST PATENT DOCUMENT

Patent Document 1: Japanese Unexamined Patent Application Publication No. 2011-166581

SUMMARY OF THE INVENTION

Technical Problem to be Solved by the Invention

However, the system disclosed in the Patent Document 1 has a problem that the transmission performance of the one communication channel may degrade the communication performance of the network. This system also has a problem that it cannot automatically grasp its communication performance, which is required to perform calculation or control on the distributed devices.

Accordingly, an object of the present invention is to solve the problems with the transmission performance of the communication channels of distributed control systems.

Solution to the Problem

A disclosed distributed control system is a distributed control system in which a central communication device and multiple terminal communication devices connected to target devices to be controlled are connected through a network. In response to receiving input/output performance of the terminal communication devices previously set in input/output performance storage tables of the terminal communication devices, the central communication device generates communication paths between the central communication device and the terminal communication devices through the network on the basis of the received input/output performance and sets the generated communication paths in communication path setting units of the terminal communication devices. The terminal communication devices transmit or receive data to or from the central communication device through the communication paths on the network set by the central communication device.

Advantageous Effects of the Invention

According to the present invention, the bottleneck occurred by the transmission performance of the communication channels can be solved.

BRIEF DESCRIPTION OF THE DRAWINGS

FIG. 4 is a diagram showing the storage form of input/output performance.

FIG. 5 is a diagram showing the storage form of an input/output performance storage unit of the central communication device.

FIG. 9 is a diagram showing the storage form of a setting communication path storage unit of the central communication device.

FIG. 11 is a diagram showing the storage form of a packet division information storage unit of the central communication device.

FIG. 12 is a diagram showing the storage form of a communication path setting unit of a terminal communication device.

FIG. 13 is a diagram showing the storage form of a packet division setting unit of a terminal communication device.

DESCRIPTION OF THE EMBODIMENTS

Figure 1:
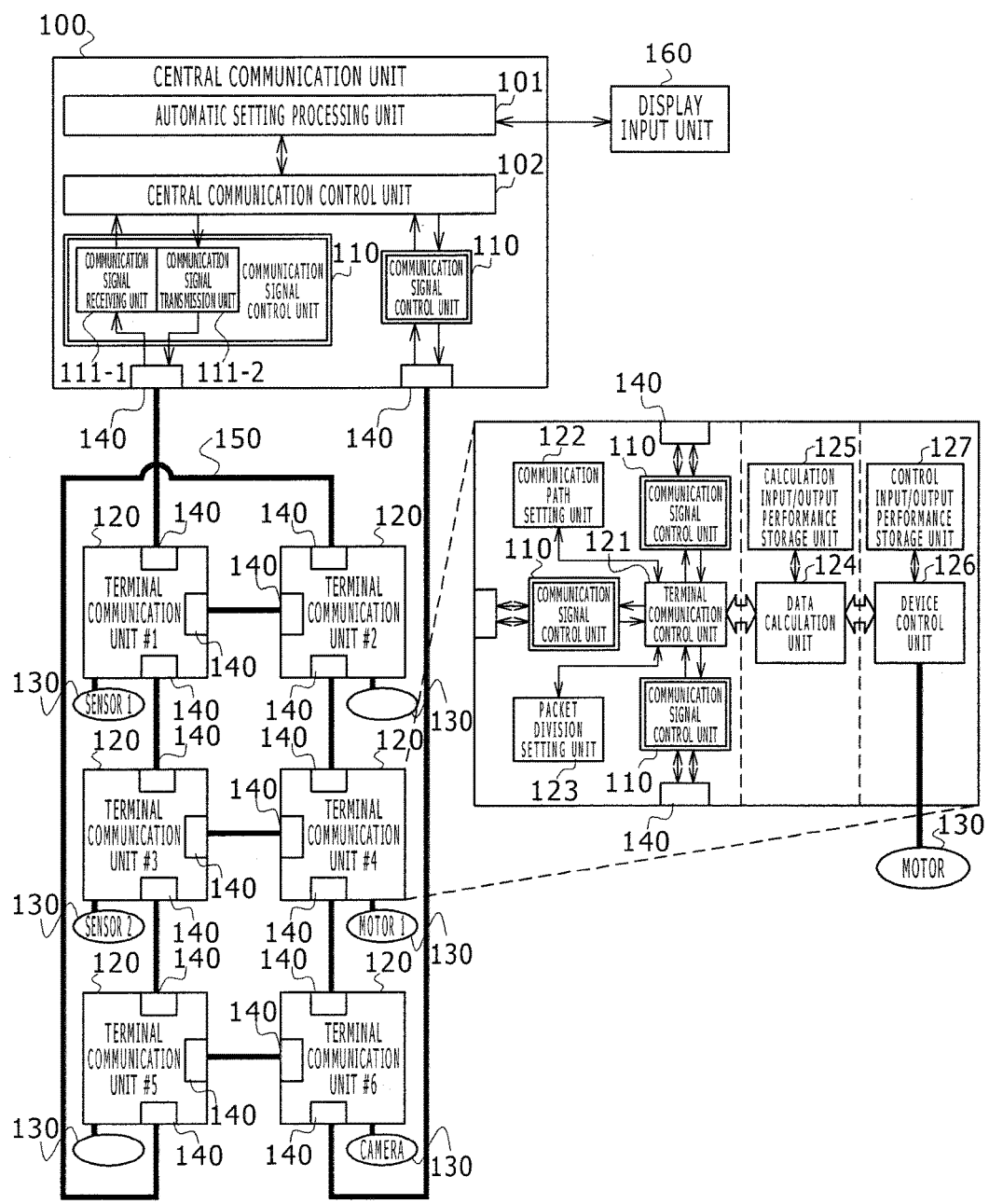
FIG. 1 is a block diagram showing an example configuration of a distributed control system.

FIG. 1 is a configuration diagram of a distributed control system of the present embodiment. This distributed control system includes a central communication device 100, multiple terminal communication devices 120, a display input device 160 connected to the central communication device 100, target devices to be controlled 130 connected to the terminal communication devices 120, and a network formed by connecting the central communication device 100 and the terminal communication devices 120 through a communication channel 150.

The central communication device 100 includes multiple sets of a communication signal control unit 110 and a communication port 140, an automatic setting processing unit 101, and a central communication control unit 102. Each communication signal control unit 110 includes a communication signal receiving unit 111-1 and a communication signal transmission unit 111-2.

Each terminal communication device 120 includes multiple sets of a terminal communication control unit 121, a communication path setting unit 122, a packet division setting unit 123, a data calculation unit 124, a calculation input/output performance storage unit 125, a device control unit 126, a control input/output performance storage unit 127, a communication signal control unit 110, and a communication port 140.

The network includes a transmission channel 150 connecting the multiple communication ports 140 of the central communication device 100 and at least one communication port 140 of each of the multiple terminal communication devices 120. The network also includes a communication channel 150 connecting at least one communication port 140 of each terminal communication device 120 and a communication port 140 of the central communication device 100 or a communication port 140 of another terminal communication device 120.

Since each communication signal control unit 110 includes a corresponding communication signal receiving unit 111-1 and communication signal transmission unit 111-2, it can establish a communication by connecting the communication channel 150 to a corresponding communication port 140, without having to consider the communication directions of the central communication device 100 and terminal communication devices 120 to each other on the network.

Figure 2:
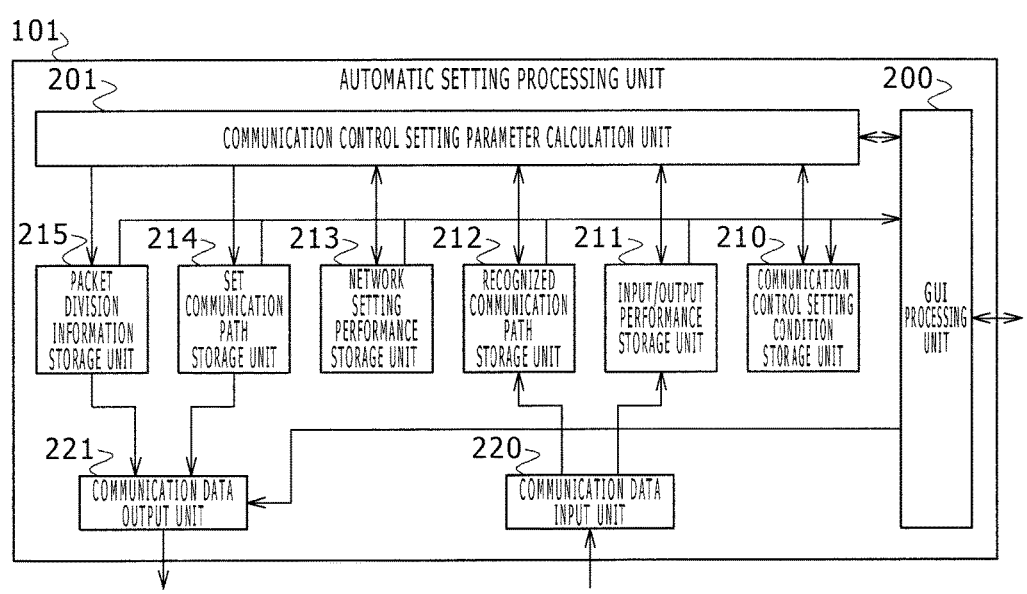
FIG. 2 is a diagram showing details of an automatic setting processing unit of a central communication device.

FIG. 2 is a function block diagram of the automatic setting processing unit 101 of the central communication device 100. The automatic setting processing unit 101 of the central communication device 100 includes a GUI processing unit 200, a communication control setting parameter calculation unit 201, a communication control setting condition storage unit 210, an input/output performance storage unit 211, a recognized communication path storage unit 212, a network setting performance storage unit 213, a set communication path storage unit 214, a packet division information storage unit 215, a communication data input unit 220, and a communication data output unit 221.

Figure 3:
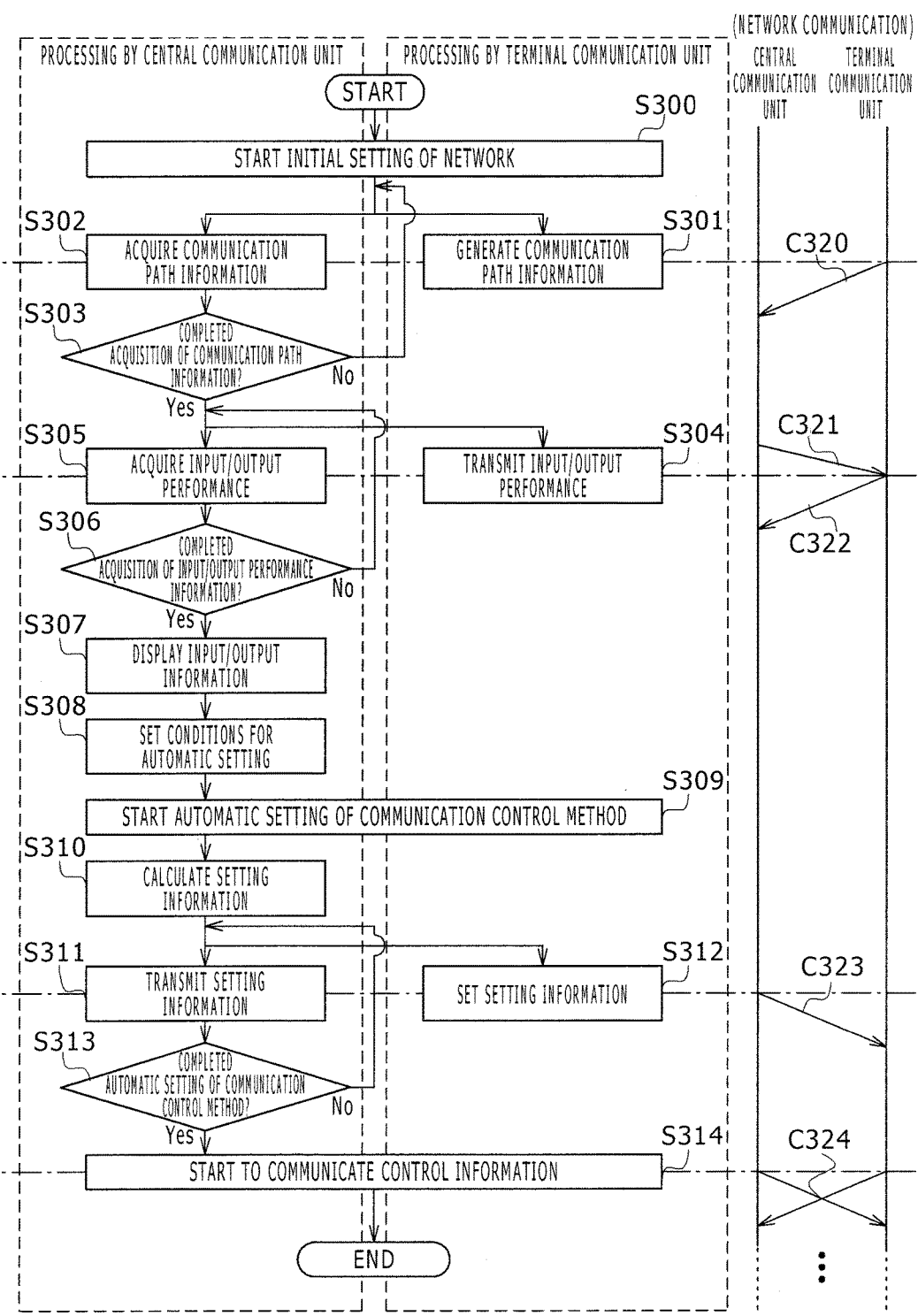
FIG. 3 is a flowchart showing the automatic setting processing procedure of the distributed control system.

FIG. 3 is a flowchart showing the automatic setting procedure of the distributed control system. In the distributed control system, first, the central communication device 100 and all the terminal communication devices 120 connected to the network 150 start to make the initial settings of the network in accordance with an instruction from the display input device 160 (S300).

Then, each terminal communication devices 120 generates communication path information, which is information indicating a communication path on the network (S301). At this time, each terminal communication device 120 transfers the generated communication path information to the central communication device 100 through the network 150 (C320). The central communication device 100 acquires the communication path information transferred from each terminal communication device 120 (S302) and the acquired communication path information is stored in the recognized communication path storage unit 212 of the automatic setting processing unit 101.

The central communication device 100 acquires the path information over a predetermined time. If it determines that it has completed the acquisition of the communication path information (YES in S303), the central communication device 100 transfers input/output performance transmission start commands to all the terminal communication devices 120 through the network (C321). Each terminal communication device 120 transfers its input/output performance (S304, C322). The input/output performance transferred to the central communication device 100 by each terminal communication device 120 is the input/output performance of a target device to be controlled 130 connected to the terminal communication device 120, such as a sensor or actuator, and/or the calculation input/output performance of the corresponding data calculation unit 124. The central communication device 100 acquires the input/output performance transferred from each terminal communication device 120 (S305) and the acquired input/output performance is stored in the input/output performance storage unit 211 of the automatic setting processing unit 101. If the central communication device 100 determines that it has not completed the acquisition of the communication path information yet (NO in S303), it repeats the acquisition of the communication path information.

If the central communication device 100 determines that it has acquired the input/output performance information from all the terminal communication devices 120 (YES in S306), it causes the GUI processing unit 200 of the automatic setting processing unit 101 to process the acquired input/output performance information and then outputs the resulting input/output performance information to the display input device 160 (S307). In contrast, if the central communication device 100 determines that it has not acquired the input/output performance information from all the terminal communication devices 120 yet (NO in S306), it repeats the acquisition of the input/output performance information.

The central communication device 100 sets the automatic setting conditions of the communication control method in accordance with an instruction from the display input device 160 (S308). As used herein, the automatic setting conditions of the communication control method refer to whether the compensation for the input/output cycle is required when automatically setting the communication control method and whether the compensation for the input/output response is required when automatically setting the communication control method.

The central communication device 100 starts to automatically set the communication control method in accordance with an instruction from the display input device 160 (S309). The central communication device 100 determines setting information using a method (to be discussed later) on the basis of the acquired communication path information, the input/output performance information, and the set automatic setting conditions of the communication control method (S310).

The central communication device 100 transfers path information and packet division information to the terminal communication devices 120 through the network 150 (S311, C323). At this time, the central communication device 100 transfers communication path information stored in the set communication path storage unit 214 of the automatic setting processing unit 101 and packet division information stored in the packet division information storage unit 215. The terminal communication control unit 121 of each terminal communication device 120 receives the communication path information transferred from the central communication device 100 and sets it in the communication path setting unit 122, as well as sets the packet division information transferred from the central communication device 100 in the packet division setting unit 123 (S312).

If the central communication device 100 and terminal communication devices 120 determine that they have completed the automatic setting of the communication control method (YES in S313), they start to communicate control information (S314, C324). In contrast, if they determine that they have not completed the automatic setting of the communication control method yet (NO in S313), they repeat the automatic setting of the communication control method.

FIG. 4 is a diagram showing the input/output performance storage form of the calculation input/output performance storage unit 125 and control input/output performance storage unit 127 of each terminal communication device 120. The input/output performance is stored in input/output performance storage tables 400 of the calculation input/output performance storage unit 125 and control input/output performance storage unit 127 of each terminal communication device 120.

The input/output performance storage table 400 includes an amount of packet data storage region 401, an input cycle storage region 402, an output cycle storage region 403, an input response storage region 404, and an output response storage region 405.

The amount of packet data storage region 401 stores the amount of data of each packet transferred from each terminal communication device 120. The input cycle storage region 402 stores a parameter indicating an input cycle requested of each packet transferred from each terminal communication device 120. The output cycle storage region 403 stores a parameter indicating an output cycle requested of each packet transferred from each terminal communication device 120. The input response storage region 404 stores a parameter indicating an input response requested of each packet transferred from each terminal communication device 120. The output response storage region 405 stores a parameter indicating an output response requested of each packet transferred from each terminal communication device 120.

Before the distributed control system operates, the input/output performance of the target device to be controlled is set in the input/output performance storage tables 400 of the calculation input/output performance storage unit 125 and control input/output performance storage unit 127 of each terminal communication device 120. The setting of input/output performance in the input/output performance storage table 400 may be performed based on communications in the distributed control system. The setting of input/output performance in the input/output performance storage table 400 may also be performed using a method which does not use the distributed control system.

The calculation input/output performance storage unit 125 stores input/output performance depending on the calculation ability of the data calculation unit 124. Specifically, if the input/output performance between the terminal communication control unit 121 and the communication channel 150 through the port 140 is lower than the input/output performance between the device control unit 126 and the target device to be controlled 130, the data calculation unit 124 thins out packets from the device control unit 126 and outputs the resulting packets to the terminal communication control unit 121. Conversely, the data calculation unit 124 generates packets interpolation packets based on packets from the terminal communication control unit 121 and outputs them to the device control unit 126. Accordingly, if the input/output performance between the terminal communication control unit 121 and the communication channel 150 through the port 140 is higher than the input/output performance between the device control unit 126 and the target device to be controlled 130, it is not necessary to provide the data calculation unit 124 or calculation input/output performance storage unit 125. Further, if the input/output performance between the device control unit 126 and the target device to be controlled 130 is not limited by the target device to be controlled 130, that is, if even low performance is acceptable, the device control unit 126 and control input/output performance storage unit 127 may be omitted.

In transferring communication performance information to the central communication device 100, each terminal communication device 120 transmits all parameters stored in the input/output performance storage table 400. If each terminal communication device 120 includes one of the calculation input/output performance storage unit 125 and control input/output performance storage unit 127, it transfers, as input/output performance information, information stored in that storage unit to the central communication device 100 on the basis of an operation of the terminal communication control unit 121. Further, if each terminal communication device 120 includes multiple calculation input/output performance storage units 125 or multiple control input/output performance storage units 127, it transfers, as input/output performance information, all information stored in those storage units to the central communication device 100 on the basis of an operation of the terminal communication control unit 121.

If each terminal communication device 120 includes both the calculation input/output performance storage unit 125 and control input/output performance storage unit 127, it transfers, as input/output performance information, information stored in the calculation input/output performance storage unit 125 to the central communication device 100 on the basis of an operation of the terminal communication control unit 121. Further, if each terminal communication control unit 121 includes multiple calculation input/output performance storage units 125 and multiple control input/output performance storage units 127, it transfers, as input/output performance information, information stored in all the calculation input/output performance storage units 125 to the central communication device 100 on the basis of an operation of the terminal communication control unit 121.

FIG. 5 is a diagram showing the input/output performance storage form of the input/output performance storage unit 211 of the automatic setting processing unit 101 of the central communication device 100. The input/output performance storage unit 211 of the automatic setting processing unit 101 stores input/output information in a central input/output performance storage table 500. The central input/output performance storage table 500 includes input/output performance storage tables 400 corresponding to all the terminal communication devices 120. Thus, the central communication control unit 102 of the central communication device 100 stores input/output performance transferred through the communication signal control unit 110 in the central input/output performance storage table 500 of the input/output performance storage unit 211 for each terminal communication device 120.

Figure 6:
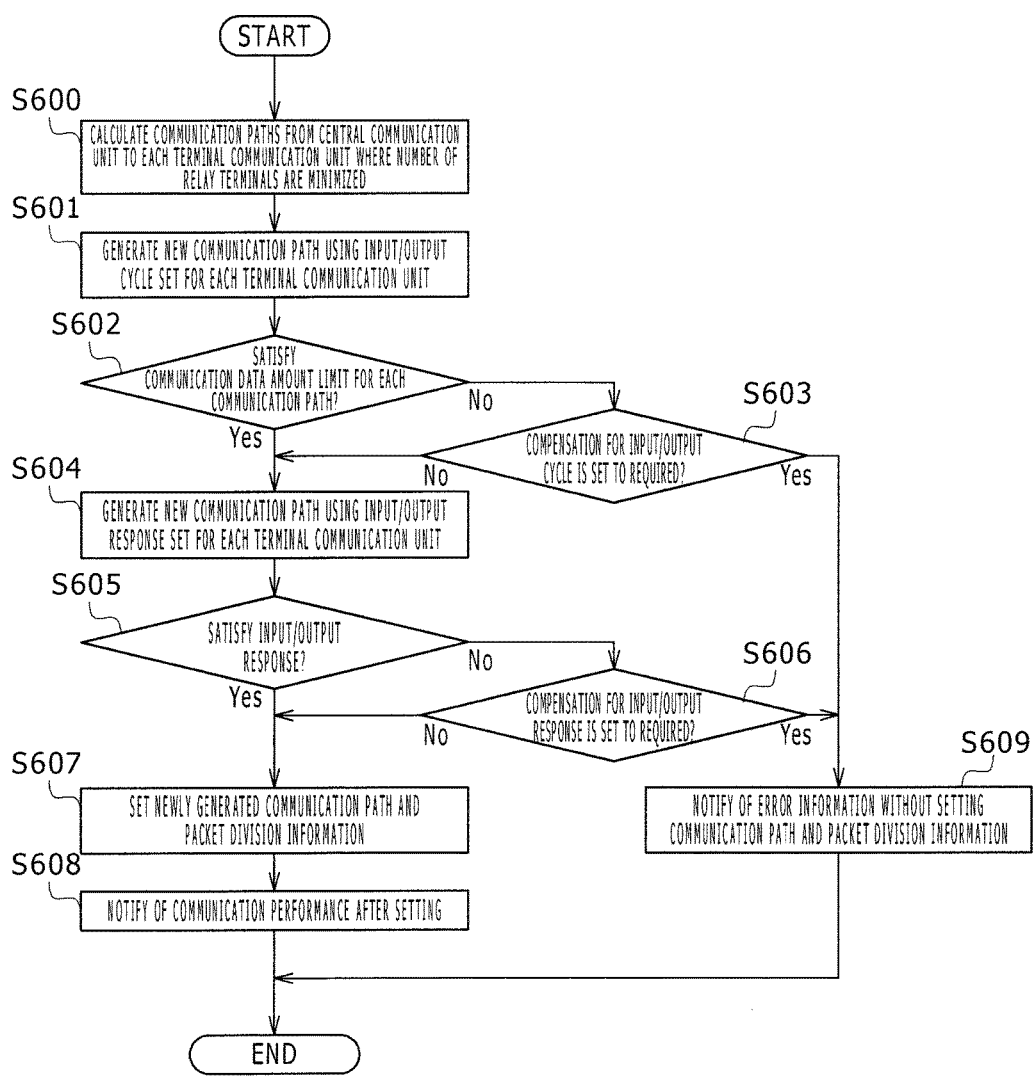
FIG. 6 is a flowchart showing details of the setting of network performance in the automatic setting processing procedure of the distributed control system.

FIG. 6 is a flowchart showing details of the determination of setting information (S310) in the automatic setting processing procedure of FIG. 3. The following process is performed by the communication control setting parameter calculation unit 201 of the automatic setting processing unit 101 of the central communication device 100.

The central communication device 100 calculates the communication paths from the central communication device 100 to the respective terminal communication devices 120 such that the number of relay terminals is minimized, on the basis of the recognized information about the communication paths from the central communication device 100 to the respective terminal communication devices 120 (S600). As used herein, the number of relay terminals refers to the number of other terminal communication devices 120 present on the communication path from the central communication device 100 to one terminal communication device 120.

The central communication device 100 then generates new communication path information using the path information calculated in step 600 and the parameters in the input cycle 402 and output cycle 403 in the acquired input/output performance information of each terminal communication device 120 and using a method (to be discussed later) (S601).

If the amounts of communication data actually transmitted or received on all the new communication paths generated in step S601 are smaller than or equal to the maximum communication data amounts of the respective communication channels (YES in S602), the central communication device 100 generates new communication path information using the communication path information generated in step S601 and the parameters in the input response 404 and output response 405 in the acquired input/output performance information of each terminal communication device 120 and using a method (to be discussed later) (S604).

In contrast, if the amounts of communication data actually transmitted or received on all the new communication paths generated in step S601 are not smaller than or equal to the maximum communication data amounts of the respective communication channels (NO in S602), the central communication device 100 refers to the condition setting of the automatic setting. If the compensation for the input/output cycle is set to required (YES in S603), it notifies the display input device 160 of error information without setting new communication paths (S609), ending the process. If the guarantee of the input/output cycle is set to not required when referring to the condition setting of the automatic setting (NO in S603), the central communication device 100 generates new communication path information using the communication path information generated in step S601 and the parameters in the input response 404 and output response 405 in the acquired input/output performance information of each terminal communication device 120 and using a method (to be discussed later) (S604).

If the input/output responses in the actual system on all the new communication paths generated in step S604 are lower than or equal to the input/output responses acquired from the respective terminal communication devices 120 (YES in S605), the central communication device 100 sets the communication path information newly generated in step S604 and the packet division information in the setting communication path storage unit 214 of the automatic setting processing unit 101 (S607).

In contrast, if the input/output responses of communications actually transmitted or received on all the newly generated communication paths are not lower than or equal to the input/output responses acquired from the respective terminal communication units 120 (NO in S605), the central communication device 100 refers to the condition setting of the automatic setting. If the compensation for the input/output response is set to required (YES in S606), it notifies the display input device 160 of error information without setting new communication paths in S604 (S609), ending the process. If the compensation for the input/output response is set to not required when referring to the condition setting of the automatic setting (NO in S606), the central communication device 100 sets the communication path information newly generated in step S604 and the packet division information in the setting communication path storage unit 214 of the automatic setting processing unit 101 (S607).

The central communication device 100 calculates the theoretical value of the communication performance of the network from the communication path information generated for all the terminal communication devices 120 and the packet division information and stores the theoretical value in the network setting performance storage unit 213 of the automatic setting processing unit 101 (S608), ending the process.

Figure 7:
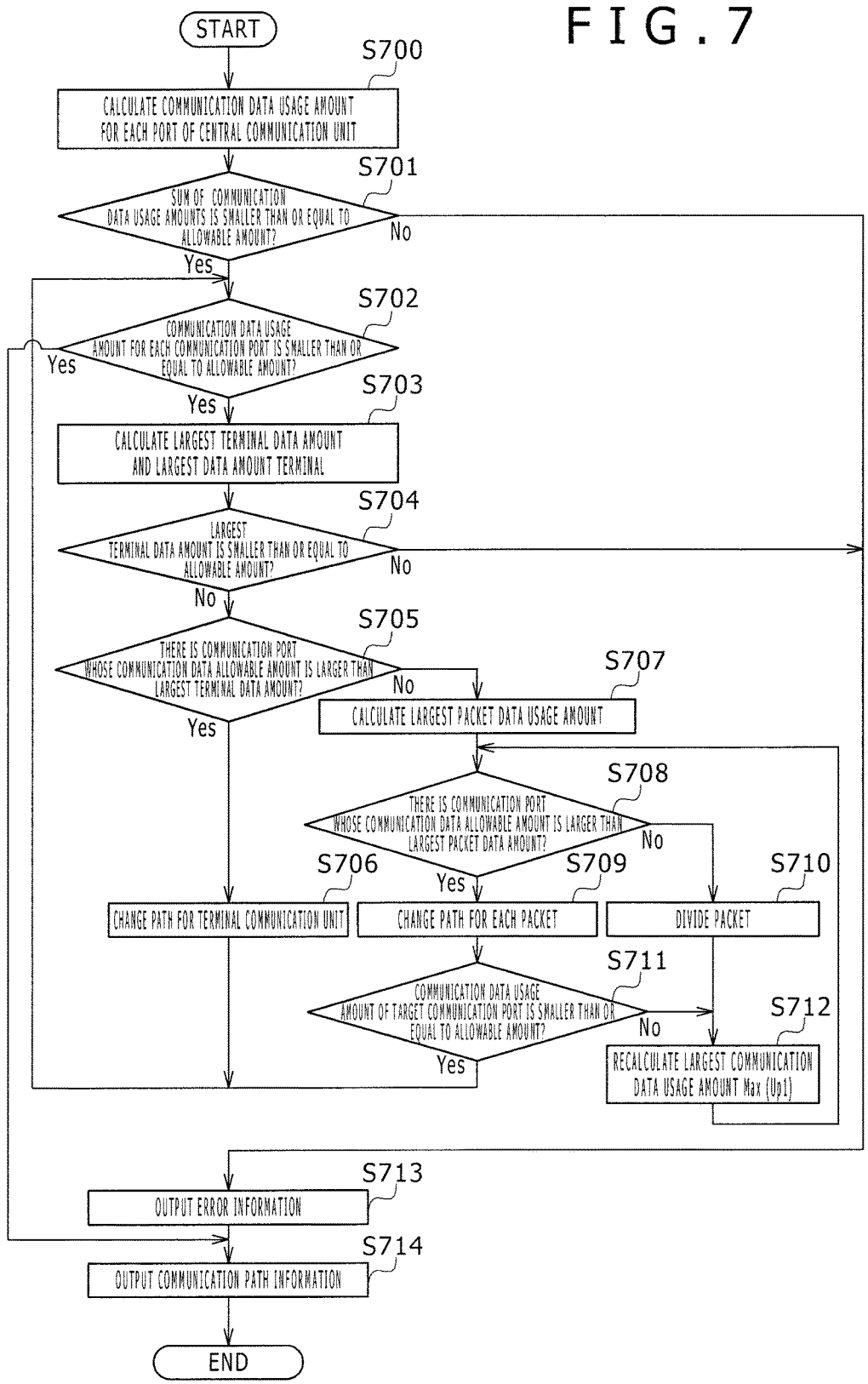
FIG. 7 is a flowchart showing a communication path generation procedure based on input/output cycle performance in the processing procedure of the network performance setting.

FIG. 7 is a flowchart showing the generation of communication paths based on the input/output cycle performance (S601) in the network performance setting processing procedure of FIG. 6. The following process is performed by the communication control setting parameter calculation unit 201 of the automatic setting processing unit 101 of the central communication device 100. Assume that the distributed control system calculates all the amounts of communication data in both directions, that is, in a direction from the central communication device 100 to the terminal communication devices 120 and in a direction from the terminal communication devices 120 to the central communication device 100. Also assume that the distributed control system performs communications using packets in which data transferred through a communication and control information for communication processing are combined.

The central communication device 100 calculates the communication data usage amount for each of the multiple communication ports 140 thereof on the basis of the input/output performance information acquired from each terminal communication device 120 and the path information (S700).

If the sum of the communication data usage amounts of all the communication ports 140 is smaller than or equal to the maximum allowable communication data amount of the central communication device 100 (YES in S701), the central communication device 100 proceeds to step S702. If the sum is not smaller than or equal to the maximum allowable amount (NO in S701), the central communication device 100 outputs error information indicating that the amount of communication data actually transmitted or received on the network exceeds the maximum communication data amount of each communication channel 150 (S713) and proceeds to step S714.

The central communication device 100 compares the communication data usage amount of each of the communication ports 140 thereof with the maximum allowable communication data amount of a single communication channel (hereafter referred to as the communication channel maximum allowable amount). If there is even a single communication port 140 whose communication data usage amount exceeds the communication channel maximum allowable amount (NO in S702), the central communication device 100 proceeds to step S703. If the communication data usage amounts of all the communication ports 140 are smaller than or equal to the communication channel maximum allowable amount (YES in S702), the central communication device 100 outputs the changed communication path information (if no change is made, the communication paths where the number of relay terminals corresponding to each terminal communication device 120 is minimized) (S714), ending the process.

The central communication device 100 defines communication ports 140 exceeding the allowable amount in step S702 as data amount exceeding communication ports, calculates the respective communication data amounts of the relay terminal communication devices 120 present on the communication path for one of the data amount exceeding communication ports, determines the largest of the calculated communication data amounts as a terminal largest data amount, and determines a terminal communication device 120 having the largest data amount as a largest data amount terminal (S703). If the terminal largest data amount is smaller than or equal to the communication channel maximum allowable amount of a communication port 140 through which the packet of the largest data amount terminal can pass, of the communication ports 140 of the central communication device 100 (YES in S 704), the central communication device 100 proceeds to step S705. If the terminal largest data amount is not smaller than or equal to the communication channel maximum allowable amount of a communication port 140 through which the packet of the largest data amount terminal can pass, of the communication ports 140 of the central communication device 100 (NO in S704), the central communication device 100 outputs error information indicating that the amount of communication data actually transmitted or received on the network exceeds the maximum allowable amount of each communication channel, to the display input device 160 (S712), ending the process.

The central communication device 100 obtains the communication data surplus amount for each of the communication ports 140 thereof by subtracting the communication data usage amount of each communication port 140 from the communication channel maximum allowable amount and compares the obtained communication data surplus amounts with the terminal largest data amount. If there is even one communication port 140 whose communication data surplus amount is greater than or equal to the terminal largest data amount (YES in S705), the central communication device 100 changes the communication path of each terminal communication device 100 (S706) and then returns to step S702. In changing the communication path of each terminal communication device 100, the central communication device 100 changes the communication path of the largest data amount terminal so that the communication path passes through one of the communication ports 140 of the central communication device 100 whose communication data surplus amount is greater than or equal to the terminal largest data amount. If the communication data surplus amounts of all the communication ports 140 of the central communication device 100 are not greater than or equal to the terminal largest data amount (NO in S705), the central communication device 100 proceeds to step S707.

The central communication device 100 determines, as a largest packet data amount, a packet having the largest data amount of multiple packets using which the largest data amount terminal performs communications and determines, as a largest data amount packet, a packet type having the largest packet data amount (S707).

The central communication device 100 compares the communication data surplus amounts of the communication ports 140 thereof with the largest packet data amount. If there is even one communication port 140 whose communication data surplus amount is greater than or equal to the largest packet data amount (YES in S708), the central communication device 100 changes the communication path of each packet (S709). In changing the communication path of each packet, the central communication device 100 changes the communication path of the largest data amount packet so that the communication path passes through one of the communication ports 140 of the central communication device 100 whose communication data surplus amount is greater than or equal to the terminal largest data amount.

If the communication data surplus amounts of all the communication ports 140 of the central communication device 100 are not greater than or equal to the largest packet data amount (NO in S708), the central communication device 100 divides the packet (S710). In dividing the packet, the central communication device 100 divides the largest packet data amount so that the largest packet data amount becomes smaller than or equal to the largest of the communication data surplus amounts of the communication ports 140 of the central communication device 100. While the packet is divided into equal portions (two equal portions, three equal portions, four equal portions, etc.) in the present embodiment, the packet may be divided otherwise. After dividing the packet, the central communication device 100 proceeds to step S711.

After step S709, the central communication device 100 recalculates the communication data usage amount of the data amount exceeding communication port selected in step S705. If this communication data usage amount is smaller than or equal to the communication channel maximum allowable amount (YES in S711), the central communication device 100 returns to step S702. If the communication data usage amount is not smaller than or equal to the communication channel maximum allowable amount (NO in S711), the communication signal control unit 110 recalculates the largest packet data amount (S712) and returns to step S709.

Figure 8:
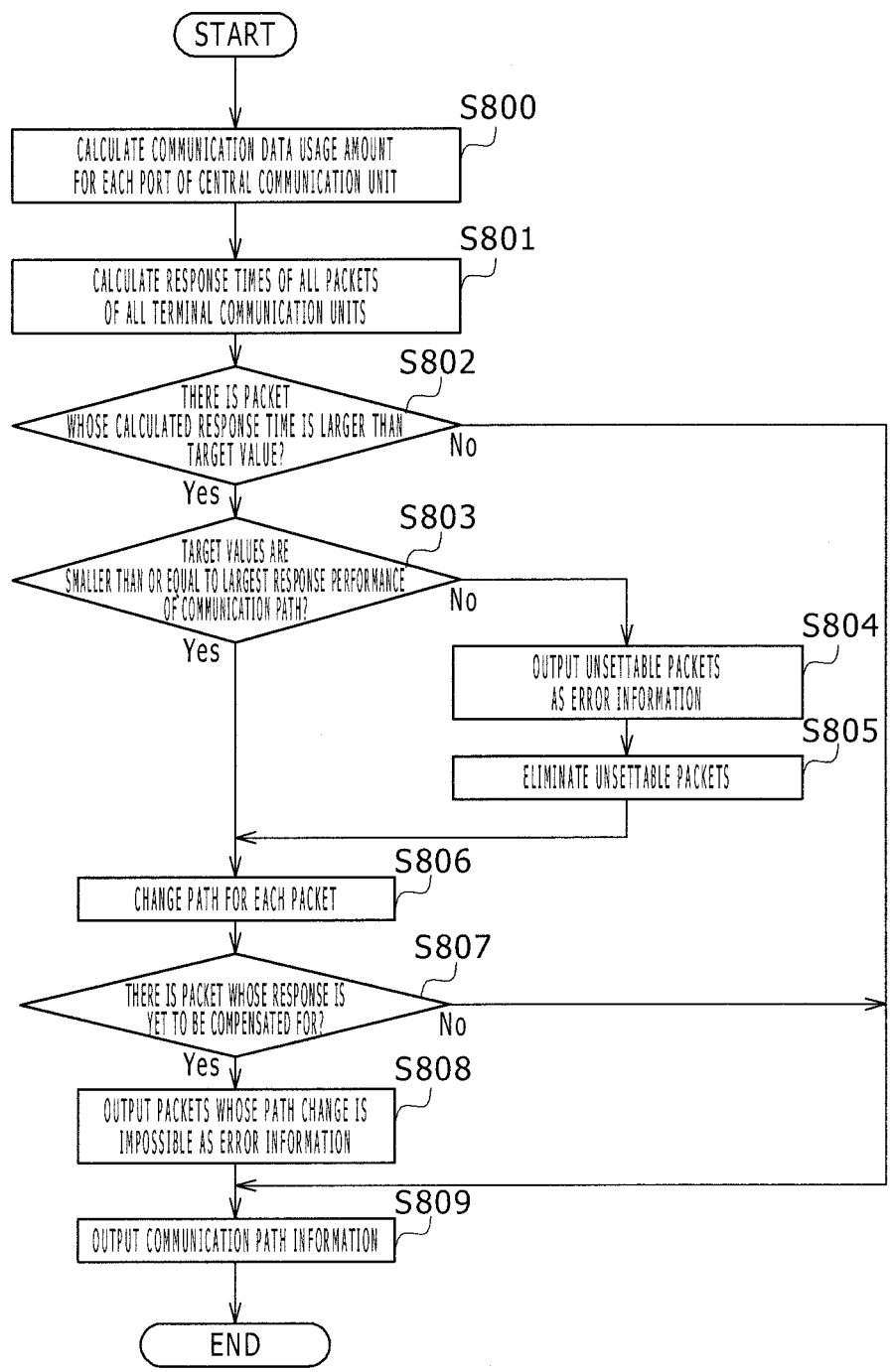
FIG. 8 is a flowchart showing a communication path generation procedure based on input/output response performance in the processing procedure of the network performance setting.

FIG. 8 is a flowchart showing the generation of communication paths based on the input/output response performance (S604) in the network performance setting processing procedure of FIG. 6. The following process is performed by the communication control setting parameter calculation unit 201 of the automatic setting processing unit 101 of the central communication device 100. Assume that the distributed control system calculates all response times in both directions, that is, in a direction from the central communication device 100 to the terminal communication devices 120 and in a direction from the terminal communication devices 120 to the central communication device 100. In this distributed control system, the parameters in the input response and output response in the input/output performance information acquired from each terminal communication device 120 are defined as response time target values. The target value of the response time of a communication from the central communication device 100 to each terminal communication device 120 corresponds to the output response, and the target value of the response time of a communication from each terminal communication device 120 to the central communication device 100 corresponds to the input response.

The central communication device 100 calculates the communication data usage amount for each of the multiple communication ports 140 thereof on the basis of the input/output performance information acquired from each terminal communication device 120 and the path information (S800). The central communication device 100 calculates the response time in the actual system for all packets of each terminal communication device 120 (S801).

The central communication device 100 compares the calculated actual-system response times with the response time target value acquired from each terminal communication device 120. If there is even one packet whose actual-system response time is greater than the response time target value (hereinafter referred to as a response-uncompensated packet) (YES in S802), the central communication device 100 proceeds to step S803. If the actual-system response times are not greater than the response time target value (NO in S802), the central communication device 100 outputs the communication path information at this time (S809), ending the process.

The central communication device 100 compares the response time target values with the maximum response performance of one communication channel 150. If all the response time target values are smaller than or equal to the maximum response performance of the communication channel 150 (YES in S803), the central communication device 100 changes the communication path of each packet (S806). If at least one response time target value exceeds the maximum response performance of the communication channel 150 (NO in S803), the central communication device 100 outputs error information indicating that corresponding all packets are unsettable packets to the display input unit 160 (S804), excludes the unsettable packets from those to be subjected to the following setting calculation (S805), and then changes the communication paths of the remaining packets (S806).

In changing the communication path of each packet, the central communication device 100 calculates the actual-system response times of all the response-uncompensated packets and calculates the response times of the communication ports 140 of the central communication device 100. In changing the communication path of each packet, if any of the calculated response times of the communication ports 140 is smaller than the response time of a response-uncompensated packet, if the same response-uncompensated packet can pass through this communication port 140, and if the actual-system response times of the respective packets do not become larger than the target value when the same response-uncompensated packet changes its path so that the path passes through the communication port 140, the central communication device 100 changes the communication path of this response-uncompensated packet so that the communication path passes through this communication port 140. The above-mentioned process is repeated until there is no longer a response-uncompensated packet or until the communication paths of any response-uncompensated packets can be no longer changed.

If there is at least one response-uncompensated packet after step S806 (YES in S807), the central communication device 100 outputs all the response-uncompensated packets as error information to the display input device 160 (S808) and proceeds to step S809. If there is no response unguaranteed packet after step S806 (NO in S807), the central communication device 100 outputs the communication path information at this time (S809), ending the process.

FIG. 9 is a diagram showing the communication path information storage form of the setting path information storage unit 214 of the automatic setting processing unit 101 of the central communication device 100. The setting path information storage unit 214 of the automatic setting processing unit 101 takes the form of a downstream communication path setting table 900 and an upstream communication path setting table 910.

The communication paths from the central communication device 100 to the respective terminal communication devices 120 are set in the downstream communication path setting table 900. The downstream communication path setting table 900 includes a downstream output port number setting region 901. In the downstream output port number setting region 901, each terminal communication device 120 which is to serve as the destination of a packet transferred by the central communication device 100 is associated with the communication port number of a communication port 140 which is to pass the packet of the multiple communication ports 140 of each of other terminal communication devices 120 which are to transfer the packet.

The communication paths from the respective terminal communication devices 120 to the central communication device 100 are set in the upstream communication path setting table 910. The upstream communication path setting table 910 includes an upstream output port number setting region 911. In the upstream output port number setting region 911, each source terminal communication device 120 which is to transfer a packet to the central communication device 100 is associated with the communication port number of a communication port 140 which is to pass the packet, of the multiple communication ports 140 of each of other terminal communication devices 120 which are to transfer the packet.

The communication control setting parameter calculation unit 201 of the automatic setting processing unit 101 stores the generated communication paths from the central communication device 100 to the respective terminal communication devices 120 in the downstream communication path setting table 900 of the setting path information storage unit 214. The communication control setting parameter calculation unit 201 of the automatic setting processing unit 101 stores the generated communication paths from the respective terminal communication devices 120 to the central communication device 100 in the upstream communication path setting table 910 of the setting path information storage unit 214.

If the communication data output unit 221 of the automatic setting processing unit 101 receives a communication control method automatic setting instruction from the display input device 160 through the GUI processing unit 200, it reads out communication port numbers set for the respective terminal communication devices 120 from the setting communication path storage unit 214 and then transfers them to the central communication control unit 102. The central communication control unit 102 receives the communication port numbers and transfers them to the respective terminal communication device 120 through the network.

Figure 10:
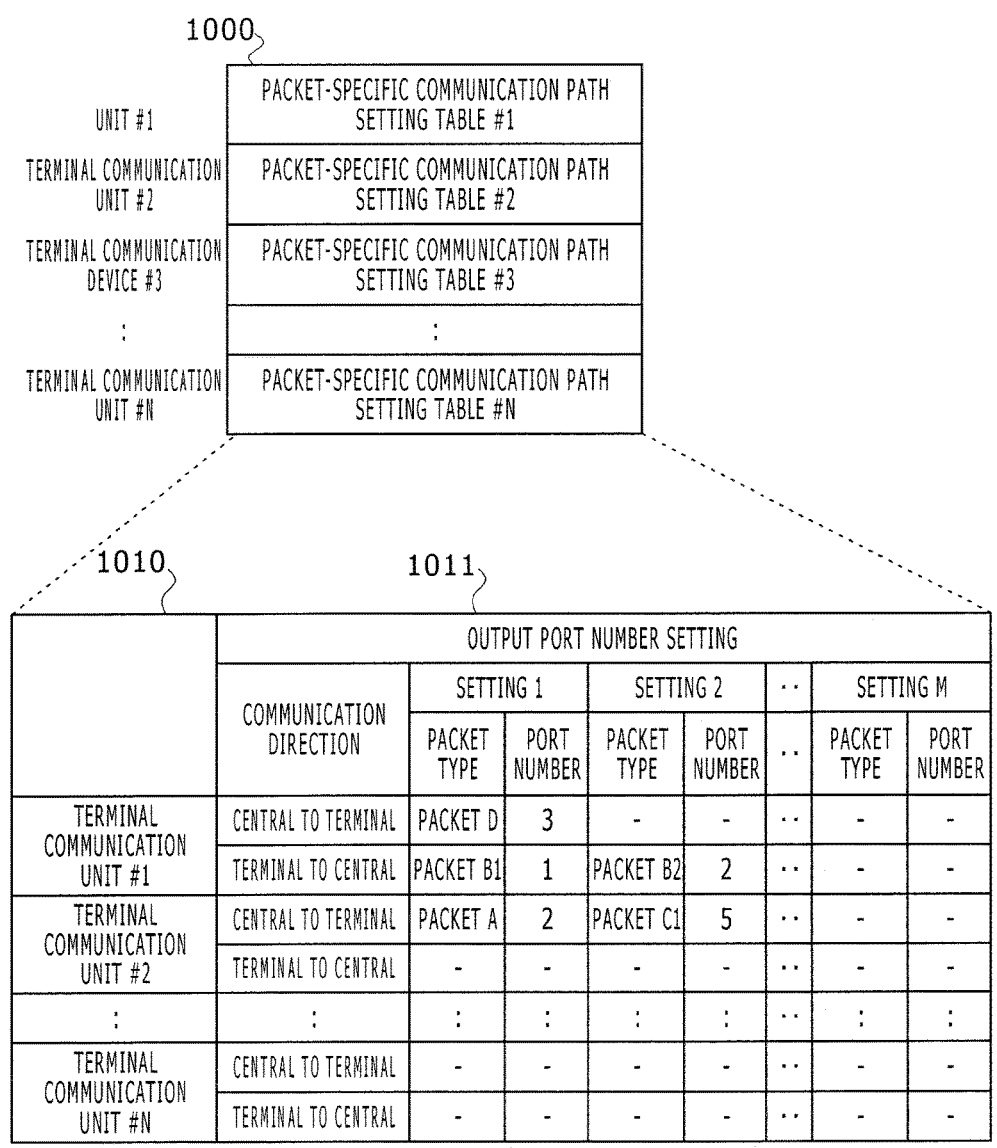
FIG. 10 is a diagram showing the storage form of packet-specific communication paths in the setting communication path storage unit of the central communication device.

FIG. 10 is a diagram showing the packet-specific communication path information storage form in the setting path information storage unit 214 of the automatic setting processing unit 101 of the central communication device 100. The setting communication path information storage unit 214 of the automatic setting processing unit 101 stores the packet-specific communication paths in a central packet-specific communication path setting table 1000.

The central packet-specific communication path setting table 1000 shows the types of packets transmitted from the central communication device 100 to the terminal communication devices 120 or from the terminal communication devices 120 to the central communication device 100 and the communication paths of the packet types. The central communication device 100 includes packet-specific communication path setting tables 1010 corresponding to the number of the terminal communication units 120.

Each packet-specific communication path setting table 1010 includes a packet-specific output port number setting region 1011. In the packet-specific output port number setting region 1011, the type of a packet transferred from the central communication device 100 to a terminal communication device 120 or from a terminal communication device 120 to the central communication device 100 is associated with the communication port number of a communication port 140 which is to pass the packet of the multiple communication ports 140 of each of other terminal communication devices 120 which are to transfer the packet, and the destination or source terminal communication device 120. Thus, the packet-specific communication paths can be designated.

The communication control setting parameter calculation unit 201 of the automatic setting processing unit 101 stores the generated packet-specific communication paths between the central communication device 100 and the respective terminal communication devices 120 in the central packet-specific communication path setting table 1000 of the setting path information storage unit 214.

If the communication data output unit 221 of the automatic setting processing unit 101 receives a communication control method automatic setting instruction from the display input device 160 through the GUI processing unit 200, it reads out packet types and communication port numbers set for the respective terminal communication devices 120 from the setting path information storage unit 214 and then transfers them to the central communication control unit 102. The central communication control unit 102 receives the packet types and communication port numbers and transfers them to the respective terminal communication device 120 through the network.

FIG. 11 is a diagram showing the packet division information storage form in the packet division information storage unit 215 of the automatic setting processing unit 101 of the central communication device 100. The packet division information storage unit 215 of the automatic setting processing unit 101 stores the packet division information in a central packet division setting table 1100.

The central packet division setting table 1100 shows types of packets which need to be divided, of packets transmitted from the central communication device 100 to the terminal communication devices 120 or transmitted from the terminal communication devices 120 to the central communication device 100 and corresponding number of partitions. The central packet division setting table 1100 includes packet division setting tables 1110 corresponding to the number of the terminal communication devices 120.

Each packet division setting table 1110 includes a packet division setting region 1111. In the packet division setting region 1111, types of packets which need to be divided, of packets transferred from the central communication device 100 to the terminal communication devices 120 or from the terminal communication devices 120 to the central communication device 100 and corresponding number of partitions are associated with the respective destination or source terminal communication devices 120. Thus, the packet division methods of the respective terminal communication devices 120 can be designated.

The communication control setting parameter calculation unit 201 of the automatic setting processing unit 101 stores the generated packet division information related to communications between the central communication device 100 and the respective terminal communication devices 120 in the central packet division setting table 1100 of the packet division information storage unit 215.

When the communication data output unit 221 of the automatic setting processing unit 101 receives a communication control method automatic setting instruction from the display input device 160 through the GUI processing unit 200, it reads out the packet types and number of partitions set for the respective terminal communication devices 120 from the packet division information storage unit 215 and then transfers them to the central communication control unit 102. The central communication control unit 102 receives the packet types and number of partitions and transfers them to the respective terminal communication device 120 through the network.

FIG. 12 is a diagram showing the storage form of the communication path setting unit 122 of a terminal communication device 120. The communication path setting unit 122 includes a terminal communication path setting table 1200 and a packet-specific communication path setting table 1010.

In the terminal communication path setting table 1200, the presence or absence of the setting of packet-specific communication path information and a destination port number are set for each communication direction. It includes a terminal downstream output port number setting region 1201 and a terminal upstream output port number setting region 1202.

In the terminal downstream output port number setting region 1201, the presence or absence of setting of communication path information of a packet transferred from the central communication device 100 to each terminal communication device 120 and the port number of the destination communication port of the terminal communication device 120 are associated with the destination terminal communication device 120.

In the terminal upstream output port number setting region 1202, the presence or absence of setting of communication path information of a packet transferred from each terminal communication device 120 to the central communication device 100 and the port number of the destination communication port of the terminal communication device 120 are associated with the source terminal communication device 120.

When the terminal communication control unit 121 of each terminal communication device 120 receives a terminal communication device 120-specific destination port number, a packet-specific destination port number, and a packet type serving as set values for the terminal communication control unit 121 through the network, it sets the set values in the terminal communication path setting table 1200 and packet-specific communication path setting table 1010. At this time, the terminal communication control unit 121 determines the presence or absence of the setting of packet-specific communication path information and sets information indicating the determination in the terminal communication path setting table 1200.

If the terminal communication control unit 121 of the terminal communication device 120 receives control information from the communication port 140 of the terminal communication device 120 after making the settings in the communication path setting unit 122, it refers to the terminal communication path setting table 1200 of the communication path setting unit 122 on the basis of information about the source and destination in this control information and transfers the control information to a communication port having a port number set in the terminal communication path setting table 1200. If the setting of packet-specific communication path information is presence when referring to the terminal communication path setting table 1200, the terminal communication control unit 121 refers to the packet-specific communication path setting table 1010. If the packet type of the received control information is set in the packet-specific communication path setting table 1010, the terminal communication control unit 121 transfers the control information to a communication port having a port number set in the packet-specific communication path setting table 1010.

FIG. 13 is a diagram showing the storage form of the packet division setting unit 123 of a terminal communication device 120. The packet division setting unit 123 includes a terminal packet division setting table 1300 and a packet division setting table 1110.

In the terminal packet division setting table 1300, the presence or absence of packet division is set for each terminal communication device 120 serving as a packet destination or packet source and for each communication direction.

When the terminal communication control unit 121 of the terminal communication device 120 receives a terminal communication unit 120-specific packet type to be divided and number of partitions, which serve as set values for the terminal communication device 120, through the network, it sets them in the packet division setting table 1110. At this time, the terminal communication control unit 121 determines the presence or absence of the setting of packet-specific communication path information and sets information indicating the determination in the terminal packet division setting table 1300.

If the terminal communication control unit 121 of the terminal communication device 120 receives control information from the communication port 140 of the terminal communication device 120 after making the settings in the packet division setting unit 123, it refers to the terminal communication path setting table 1200 of the packet division setting unit 123 on the basis of information about the source and destination in the control information. If the setting of the packet division in the terminal communication path setting table 1200 is presence, the terminal communication control unit 121 refers to the packet division setting table 1110. If the packet type of the received control information is set in the packet division setting table 1110, the terminal communication control unit 121 divides the received control information in accordance with the number of partitions set in the packet division setting table 1110. The terminal communication control unit 121 then refers to the communication path setting unit 122 and transmits the resulting packets to a predetermined communication port.

Figure 14:
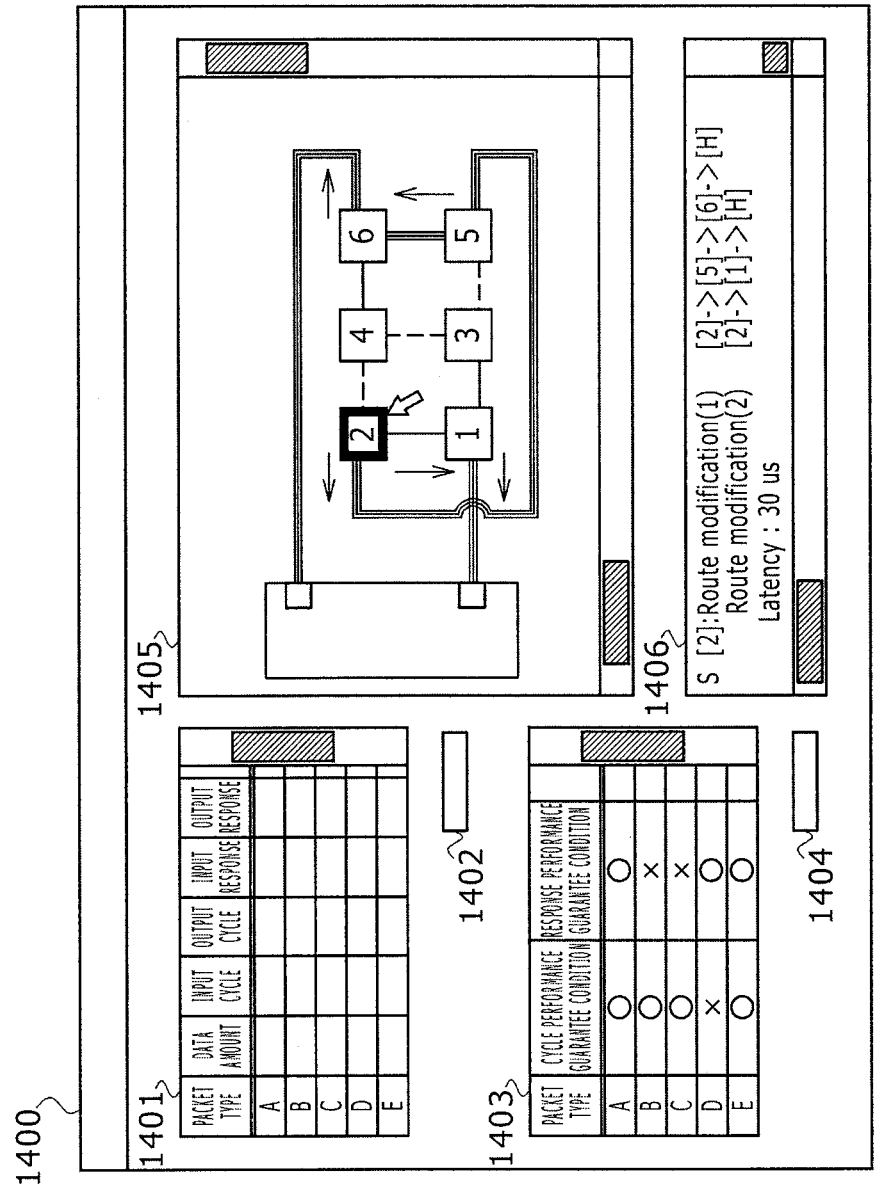
FIG. 14 is a diagram showing an example display and functions of condition setting support software.

FIG. 14 is a diagram showing an example display and functions of setting support software 1400. The setting support software 1400 is implemented in the GUI processing unit 200 of the automatic setting processing unit 101 of the central communication device 100 and displayed and operated on the display input device 160.

The setting support software 1400 includes an input/output performance display unit 1401, a network initial setting instruction unit 1402, an automatic setting condition setting unit 1403, an automatic setting condition setting instruction unit 1404, a network display unit 1405, and a network performance display unit 1406.

The input/output performance display unit 1401 displays the communication performance of each terminal communication device 120 stored in the input/output performance storage unit 211 of the automatic setting processing unit 101. The network initial setting instruction unit 1402 gives a network initial setting instruction to the communication data output unit 221 of the automatic setting processing unit 101. The communication data output unit 221 transfers communication performance transmission commands to the respective terminal communication devices 120.

The automatic setting condition setting unit 1403 receives automatic setting conditions to be stored in the communication control setting condition storage unit 210 of the automatic setting processing unit 101. The automatic setting condition setting instruction unit 1404 stores the automatic setting conditions received by the automatic setting condition setting unit 1403 in the communication control setting condition storage unit 210.

The network display unit 1405 displays the network connection configuration and communication paths of the distributed control system on the basis of the communication path information stored in the setting communication path storage unit 214 of the automatic setting processing unit 101. The network performance display unit 1406 refers to and displays the network performance stored in the network setting performance storage unit 213 of the automatic setting processing unit 101.

As seen above, the distributed control system of the present embodiment can form a network having a high degree of freedom using redundant communication paths. Specifically, it is possible to realize high network communication performance exceeding the transmission performance of a single communication path.

Further, in the distributed control system of the present embodiment, a communication can be easily established on the network having a high degree of freedom.

Since the distributed control system of the present embodiment can reduce the frequency with which a change is made to the hardware of the central communication device 100 or terminal communication devices 120, the design man-hours or design change man-hours can be reduced.

Further, the distributed control system of the present embodiment can reduce the frequency with which a change is made to the control software due to a change in hardware.

Further, the distributed control system of the present embodiment can automatically set the communication control method.

Further, the distributed control system of the present embodiment can improve the communication performance of the network without having to change the electrical transmission speed of communications or communication specification.

Further, the distributed control system of the present embodiment can simplify the network design for compensating for the communication performance.

Further, the distributed control system of the present embodiment prevents the transmission performance of one communication channel from becoming an obstacle to an improvement in the network performance.

Further, the distributed control system of the present embodiment can automatically recognize the communication performance, which is required to perform calculation or control on target devices to be controlled.

LIST OF REFERENCE SIGNS

100: central communication device, 101: automatic setting processing unit 101, 102: central communication control unit 102, 110: communication signal control unit, 111-1: communication signal receiving unit, 111-2: communication signal transmission unit, 120: terminal communication device, 121: terminal communication control unit, 122: communication path setting unit, 123: packet division setting unit, 124: data calculation unit, 125: calculation input/output performance storage unit, 126: device control unit, 127: control input/output performance storage unit, 130: target device to be controlled, 140: communication port, 150: communication channel, 160: display input device, 200: GUI processing unit, 201: communication control setting parameter calculation unit, 210: communication control setting condition storage unit, 211: input/output performance storage unit, 212: recognized communication path information storage unit, 213: network setting performance storage unit, 214: setting communication path information storage unit, 215: packet division information storage unit, 220: communication data input unit, 221: communication data output unit, 400: input/output performance storage table, 401: amount of packet data storage region, 402: input cycle storage region, 403: output cycle storage region, 404: input response storage region, 405: output response storage region, 500: central input/output performance storage table, 900: downstream communication path setting table, 901: downstream output port number setting region, 910: upstream communication path setting table, 911: upstream output port number setting region, 1000: central packet-specific communication path setting table, 1010: packet-specific communication path setting table, 1011: packet-specific output port number setting region, 1100: central packet division setting table, 1110: packet division setting table, 1111: packet division setting region, 1200: terminal communication path setting table, 1201: terminal downstream output port number setting region, 1202: terminal upstream output port number setting region, 1300: terminal packet division setting table, 1400: setting support software, 1401: input/output performance display unit, 1402: network initial setting instruction unit, 1403: automatic setting condition setting unit, 1404: automatic setting condition setting instruction unit, 1405: network display unit, and 1406: network performance display unit.

The invention claimed is:

1. A distributed control system comprising:
a central communication device; and
a plurality of terminal communication devices connected to target devices to be controlled are connected through a network,
wherein the central communication device and the plurality of terminal communication devices perform an initial setting of the network in accordance with a first instruction from a display input device,
wherein the central communication device:
receives a first set of communication path information from the plurality of terminal communication devices,
receives input/output performance from each terminal communication device, wherein the input/output performance includes at least input/output responses of a controllable target device connected to the respective terminal communication device, the controllable target device being different from any of the plurality of terminal communication devices,
sets an automatic setting condition in accordance with a second instruction from the display input device,
determines setting information based on the first set of communication path information, the input/output performance, and the automatic setting condition,
wherein the determination of the setting information includes:
the central communication device configured to generate a second set of communication path information that is new compared to the first set of communication path information,
the central communication device configured to determine whether input/output responses on paths associated with the second set of communication path information are lower than or equal to each of the input/output responses acquired from the respective terminal communication device,
when the input/output responses on the paths are lower than or equal to each of the input/output responses acquired from the respective terminal communication device, the central communication device is configured to set the generated second set of communication path information in the terminal communication devices, and when the input/output responses on the paths are not lower than or equal to each of the input/output responses acquired from the respective terminal communication device, the central communication device is configured to notify the display input device of error without setting the generated second set of communication path information if required by the automatic setting condition, wherein the terminal communication devices:

transmit or receive data to or from the central communication device through communication paths on the network set by the central communication device.

2. The distributed control system according to claim 1, wherein the central communication device generates the communication paths between the central communication device and the terminal communication devices in such a manner that an amount of communication data of a communication port of the central communication device does not exceed an amount of a maximum communication data of a communication port channel connected to the communication port, based on the amount of data, input cycles, and output cycles included in the input/output performance from the terminal communication devices.

3. The distributed control system according to claim 2, wherein the central communication device determines a communication path of data to be transmitted through the network in such a manner that the amount of the communication data of the communication port of the central communication device does not exceed the amount of the maximum communication data of the communication channel connected to the communication port, on the basis of the communication paths between the central communication device and the terminal communication devices, the amount of data, the input cycles, and the output cycles included in the input/output performance from the terminal communication devices.

4. The distributed control system according to claim 3, wherein the central communication device divides data to be transmitted through the network into a plurality of packets and determines communication paths of the packets in such a manner that the amount of the communication data of the communication port of the central communication device does not exceed the amount of the maximum communication data of the communication channel connected to the communication port, on the basis of the communication paths between the central communication device and the terminal communication devices, the amount of data, the input cycles, and the output cycles included in the input/output performance of the terminal communication devices.

5. The distributed control system according to claim 4, wherein the central communication device determines the communication paths of the packets in such a manner that a response time of the communication port of the central communication device is shorter than an input response and an output response included in the input/output performance of the terminal communication device having a communication path passing through the communication port, on the basis of the communication paths between the central communication device and the terminal communication devices, the amount of data, input responses, and output responses included in the input/output performance of the terminal communication devices.

6. The distributed control system according to claim 4, wherein the central communication device is connected to the display input device.

7. The distributed control system according to claim 4, wherein the input/output performance of each of the terminal communication devices includes one or more of the following: (i) input/output performance between the terminal communication devices and the target devices to be controlled and (ii) input/output performance between the terminal communication devices and the central communication device.

8. The distributed control system according to claim 2, wherein the central communication device divides data to be transmitted through the network into a plurality of packets and determines communication paths of the packets in such a manner that the amount of the communication data of the communication port of the central communication device does not exceed the amount of the maximum communication data of the communication channel connected to the communication port, on the basis of the communication paths between the central communication device and the terminal communication devices, the amount of data, the input cycles, and the output cycles included in the input/output performance of the terminal communication devices.

9. The distributed control system according to claim 8, wherein the central communication device determines the communication paths of the packets in such a manner that a response time of the communication port of the central communication device is shorter than an input response and an output response included in the input/output performance of the terminal communication device having a communication path passing through the communication port, on the basis of the communication paths between the central communication device and the terminal communication devices, the amount of data, input responses, and output responses included in the input/output performance of the terminal communication devices.

10. The distributed control system according to claim 8, wherein the central communication device is connected to the display input device.

11. The distributed control system according to claim 8, wherein the input/output performance of each of the terminal communication devices includes one or more of the following: (i) input/output performance between the terminal communication devices and the target devices to be controlled and (ii) input/output performance between the terminal communication devices and the central communication device.

12. The distributed control system according to claim 1, wherein the central communication device determines a method for dividing communication data which the central communication device transmits or receives to or from the terminal communication devices through the network, on the basis of the received input/output performance and sets the determined communication data dividing method in the terminal communication devices, and wherein the terminal communication devices divide data to be transmitted to the central communication device through the network into a plurality of packets in accordance with the communication data dividing method set by the central communication device.

13. The distributed control system according to claim 12, wherein the central communication device divides data to be transmitted through the network into a plurality of packets and determines communication paths of the packets in such a manner that the amount of the communication data of the communication port of the central communication device does not exceed the amount of the maximum communication data of the communication channel connected to the communication port, on the basis of the communication paths between the central communication device and the terminal communication devices, the amount of data, the input cycles, and the output cycles included in the input/output performance of the terminal communication devices.

14. The distributed control system according to claim 13, wherein the central communication device determines the communication paths of the packets in such a manner that a response time of the communication port of the central communication device is shorter than an input response and an output response included in the input/output performance of the terminal communication device having a communication path passing through the communication port, on the basis of the communication paths between the central communication device and the terminal communication devices, the amount of data, input responses, and output responses included in the input/output performance of the terminal communication devices.

15. The distributed control system according to claim 12, wherein the central communication device generates the communication paths between the central communication device and the terminal communication devices in such a manner that an amount of communication data of a communication port of the central communication device does not exceed an amount of a maximum communication data of a communication channel connected to the communication port, based on the amount of data, input cycles, and output cycles included in the input/output performance from the terminal communication devices.

16. The distributed control system according to claim 1, wherein the central communication device divides data to be transmitted through the network into a plurality of packets and determines communication paths of the packets in such a manner that the amount of the communication data of the communication port of the central communication device does not exceed the amount of the maximum communication data of the communication channel connected to the communication port, on the basis of the communication paths between the central communication device and the terminal communication devices, the amount of data, the input cycles, and the output cycles included in the input/output performance of the terminal communication devices.

17. The distributed control system according to claim 16, wherein the central communication device determines the communication paths of the packets in such a manner that a response time of the communication port of the central communication device is shorter than an input response and an output response included in the input/output performance of the terminal communication device having a communication path passing through the communication port, on the basis of the communication paths between the central communication device and the terminal communication devices, the amount of data, input responses, and output responses included in the input/output performance of the terminal communication devices.

18. The distributed control system according to claim 1, wherein the central communication device is connected to the display input device.

19. The distributed control system according to claim 1, wherein the input/output performance of each of the terminal communication devices includes one or more of the following: (i) input/output performance between the terminal communication devices and the target devices to be controlled and (ii) input/output performance between the terminal communication devices and the central communication device.

20. A method for controlling a distributed control system comprising a central communication device and a plurality of terminal communication devices connected to target devices to be controlled are connected through a network, the method comprising:
   performing, by the central communication device and the plurality of terminal communication devices, an initial setting of the network in accordance with a first instruction from a display input device;
   receiving, by the central communication device, a first set of communication path information from the plurality of terminal communication devices;
   receiving, by the central communication device, input/output performance from each terminal communication device, wherein the input/output performance includes at least input/output responses of a controllable target device connected to the respective terminal communication device, the controllable target device being different from any of the plurality of terminal communication devices;
   setting, by the central communication device, an automatic setting condition in accordance with a second instruction from the display input device;
   determining, by the central communication device, setting information based on the first set of communication path information, the input/output performance, and the automatic setting condition, wherein the determination of the setting information includes:
      the central communication device generating a second set of communication path information that is new compared to the first set of communication path information;
      the central communication determining whether input/output responses on paths associated with the second set of communication path information are lower than or equal to each of the input/output responses acquired from the respective terminal communication device;
      when the input/output responses on the paths are lower than or equal to each of the input/output responses acquired from the respective terminal communication device, the central communication device setting the generated second set of communication information in the terminal communication devices; and
      when the input/output responses on the paths are not lower than or equal to each of the input/output responses acquired from the respective terminal communication device, the central communication notifying the display input device of error without setting the generated second set of communication path information if required by the automatic setting condition; and transmitting or receiving, by the terminal communication devices, data to or from the central communication device through communication paths on the network set by the central communication device.

\* \* \* \* \*